May 30, 1933.   J. C. BLAIR   1,911,221

GLASS SURFACING APPARATUS

Filed May 6, 1926

Inventor
James C. Blair
By Frank Fraser
Attorney

Patented May 30, 1933

1,911,221

UNITED STATES PATENT OFFICE

JAMES C. BLAIR, OF TOLEDO, OHIO, ASSIGNOR TO LIBBEY-OWENS-FORD GLASS COMPANY, OF TOLEDO, OHIO, A CORPORATION OF OHIO

GLASS SURFACING APPARATUS

Application filed May 6, 1926. Serial No. 107,027.

The present invention relates to glass surfacing apparatus, and more particularly to an improved process and apparatus for supporting and holding sheets of glass while being surfaced.

An object of the present invention is to provide a preferably padded surface, adapted to support glass sheets, with means whereby the sheets may be held thereon in a substantially fixed position.

Another object of the invention is to provide a glass surfacing apparatus with means whereby a sheet of glass may be supported and rigidly held in a padded recess.

A further object of the invention is to provide a glass surfacing apparatus with means whereby a plurality of glass sheets may be supported and held rigidly within a padded recess in spaced relationship to each other and to the sides of the recess.

A further object of the invention is to provide a glass surfacing apparatus with means whereby a sheet of glass may be supported in a padded recess, and to further provide means for holding the sheet in spaced relationship to the sides of the recess.

A still further object of the invention is to provide a glass surfacing apparatus with means whereby sheets of glass may be supported in a padded recess and held rigidly in spaced relationship to the sides of the recess, and to further provide means for moving the sheets thus held and supported.

Other objects and advantages of the invention will become apparent during the course of the following description.

Figure 1:
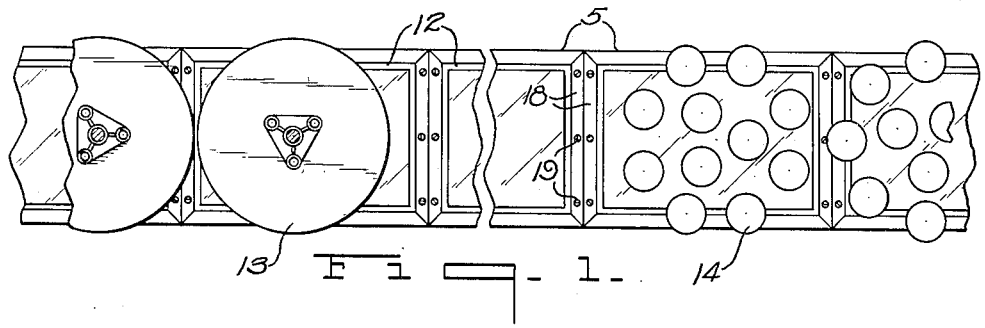
Figure 2:
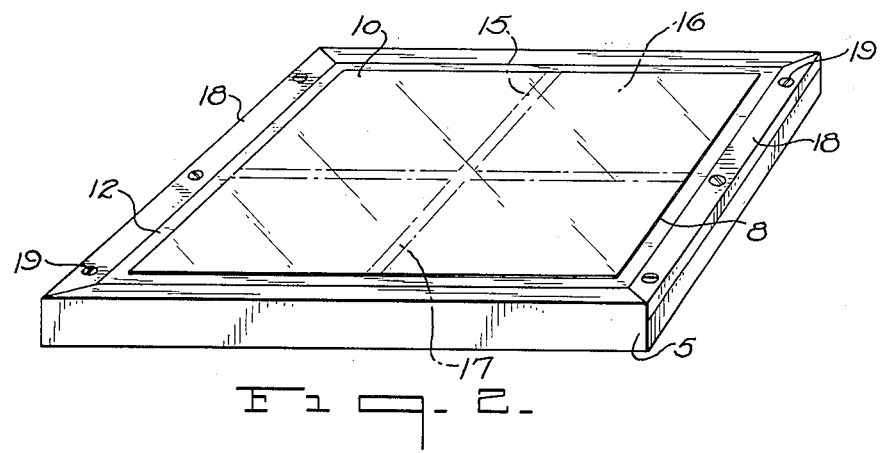
Figure 3:
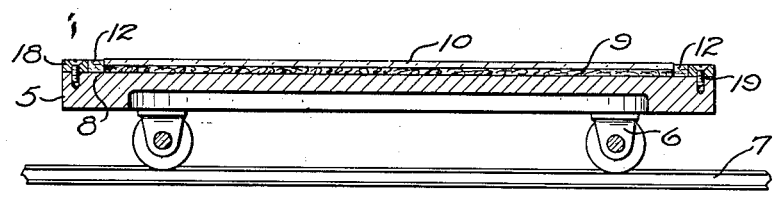

In the drawing wherein like numerals are employed to designate like parts throughout the same, Fig. 1 is a plan view of a glass surfacing apparatus showing the improvement, Fig. 2 is an enlarged perspective view of one of the sheet supporting tables shown in Fig. 1, and Fig. 3 is a cross sectional elevation of one of the tables.

Referring to the drawing in detail, the numeral 5 refers to a plurality of glass supporting tables, preferably having truck wheels 6 secured thereto, adapted to move said tables along a track 7. Supported in the table recess 8 is a pad 9 of some suitable material such as cork, felt, or the like. Resting on the pad is a sheet of glass 10, the pad 9 functioning to protect the under surface of the glass sheet 10 from being scratched or marred. The glass sheet 10 preferably has an area smaller than the area of the recess 8. In order to rigidly hold the glass sheet 10 within the recess, a suitable material 12 is cemented between the glass edges and the inner edges of the recess. This material may be plaster of Paris or some similar substance.

Suitably supported and arranged above the tables carrying the glass sheets 10 is a plurality of grinding tools 13 and polishing tools 14, the glass on the tables moving along the track 7 in the direction of the arrow in Fig. 1, carrying the sheets first beneath the grinding tools 13 and then beneath the polishing tools 14.

The dotted lines 15 in Fig. 2 indicate a manner in which a plurality of glass sheets 16 may be cemented within the recess 8, having arranged between the glass edges a filling 17 of plaster or cement such as used between the edges of the glass and the recess, thus holding the sheets rigidly therein and in spaced relationship to each other.

To facilitate the removing of the glass sheets from the recess 8, the side plates 18, forming the ends thereof, may be removed from the table 5 by taking out the screws 19.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In glass surfacing apparatus, means for supporting sheets of glass, including a table having a recess therein, a pad within the recess upon which the glass sheets may rest, and a cement insert between the glass and recess edges for holding the glass rigidly in position.

2. In sheet glass surfacing apparatus, means carrying sheets of glass being surfaced, including a moving recessed table, a pad within the recess upon which a glass sheet rests, and a cementitious filler between the glass and recess edges for retaining the glass rigidly within the recess.

3. In sheet glass surfacing apparatus, means carrying sheets of glass being surfaced, including a moving recessed table, a pad within the recess upon which a glass sheet rests, and plaster between the glass and recess edges for preventing movement of the sheet in a horizontal plane.

4. In a continuous glass surfacing apparatus, a plurality of surfacing tools, means adapted to move a plurality of glass sheets beneath said tools, including a track, a plurality of recessed tables mounted upon the track, a pad within each recess supporting the sheets of glass, and a cement or plaster filler between the edges of each sheet of glass and its respective recess edges for holding the glass rigidly in position.

5. The process of holding a sheet of glass while being surfaced, consisting in supporting said sheet in a padded recess, and causing the sheet to be held rigidly within the recess by cementing in the space between the edges of the sheet and recess.

6. In sheet glass surfacing apparatus, a glass supporting table having a recess therein adapted to receive a glass sheet to be surfaced, cushioning means within the recess upon which the said sheet rests, and a plaster filler between the sheet and recess edges only for preventing movement of said sheet in a horizontal plane, the face of the sheet adjacent the table being freely mounted with respect thereto.

7. The process of supporting a plurality of sheets of glass while being surfaced, which consists in supporting the sheets within a padded recess in spaced relation relative to one another, and in maintaining the said sheets against lateral movement within the recess and also against lateral movement relative to one another by filling in the spaces between the edges of the sheets and recess, and also the spaces between the edges of the adjacent sheets of glass with a cementitious material.

8. The process of holding a sheet of glass while being surfaced, which consists in supporting the sheet within a recess formed in a glass supporting table, with the face of the sheet to be surfaced uppermost, in resting the sheet within the recess upon a cushioning substance, and in maintaining the sheet against lateral movement within the recess by filling in the space between the sheet and recess edges only with a cementitious material while maintaining the face of the sheet adjacent the table free from attachment thereto.

Signed at Toledo, in the county of Lucas, and State of Ohio, this 4th day of May, 1926.

JAMES C. BLAIR.